United States Patent

[11] 3,624,692

| [72] | Inventor | Ivan E. Lux |
| | | 143 West Fifth St., Minden, Nebr. 68959 |
| [21] | Appl. No. | 872,239 |
| [22] | Filed | Oct. 29, 1969 |
| [45] | Patented | Nov. 30, 1971 |

[54] NUTRIENT DISTRIBUTOR FOR HYDROPONIC CELLS
6 Claims, 5 Drawing Figs.

[52] U.S. Cl. ..................................................... 47/1.2, 137/625.32, 239/115
[51] Int. Cl. ............................................... A01g 31/02
[50] Field of Search ........................................... 137/625.32; 239/59, 63, 103, 110, 114–115, 106; 47/1.2, 34, 38–39, 48.5, 18

[56] References Cited
UNITED STATES PATENTS

| 443,155 | 12/1890 | Wallace | 239/115 |
| 1,815,676 | 7/1931 | Medveczky | 47/38 |
| 1,984,265 | 12/1934 | Hamer | 47/48.5 |
| 2,436,652 | 2/1948 | Lee | 47/1.2 |
| 2,711,185 | 6/1955 | Rhodes | 137/625.32 |
| 3,053,011 | 9/1962 | Silverman | 47/38 |
| 3,204,872 | 9/1965 | Whear | 239/63 |

FOREIGN PATENTS

| 1,024,483 | 1/1953 | France | 47/38.1 |

Primary Examiner—Robert E. Bagwill
Attorney—Dodge & Ostmann

ABSTRACT: A hydroponic cell, filled with granular material, is provided with a flow path for liquid nutrient extending through one of its walls. The terminal portion of the flow path in the cell is encircled by an apertured member which is movable relatively to the terminal portion of the flow path whereby the flow path is cleared of roots which are either cut off or wiped back into the cell.

PATENTED NOV 30 1971

3,624,692

INVENTOR
IVAN E. LUX

BY Dodge & Ostmann

ATTORNEYS

NUTRIENT DISTRIBUTOR FOR HYDROPONIC CELLS

BACKGROUND OF THE INVENTION

It is known in horticulture to grow plants in liquid growth-sustaining media. Commonly a plant (or a number of plants) is placed in a container or cell and the cell is connected to a pipe through which the liquid medium is supplied to and drained from the cell. The cell is filled with a granular material in which the plant is rooted. This granular material serves as a means to support the plant and to provide a moist mass around the roots, but commonly plays no role in the nutrition of the plant.

The growing period consists of a number of repetitive cycles in which liquid nutrient is pumped into the cell to a desired level, held for a period of time, then drained from the cell; and, after the lapse of a selected time period, the cycle is repeated. As the plant develops, the root system enlarges and parts of it will extend into the supply or drain connections and interfere with nutrient flow either to or from the cell. The invention is primarily concerned with this problem.

THE INVENTION

The cell has a flow connection or connections through one of its walls, preferably the bottom wall. The submerged terminus of this flow connection is encircled by an apertured wall member mounted so as to be movable relatively to the terminus. Movement of the apertured wall member will cause roots which have entered the apertures to be removed either by wiping them into the cell or by cutting them. In the preferred form, the apertured wall consists of an upright, open-ended, circular cylindrical sleeve having apertures near its lower end. Its upper end extends above the level of the material in the cell. A combined supply and drain connection extends through the bottom of the cell and is provided with a fitting about which the sleeve may be rotated. The fitting has a cylindrical bearing surface. The bearing surface may be provided with a flat or a groove which acts as the cutting edge. Small roots are displaced from the apertures in the sleeve while the larger ones are cut. The use of an open-ended cylinder is preferred because it affords a convenient means to observe the flow of nutrient to and from the cell. If flow in eight direction is impeded, the plant will receive an inadequate supply of liquid nutrient, or the nutrient will be present in the cell for an undesirably long portion of the feeding cycle.

The apertured member can be arranged to reciprocate along the guide bearing in order that the roots may be displaced or cut, and such an arrangement is contemplated within the scope of this invention.

BRIEF DESCRIPTION OF THE DRAWING

The invention will be described herein with reference to the accompanying drawing in which.

DESCRIPTION OF THE EMBODIMENTS

Figure 1:
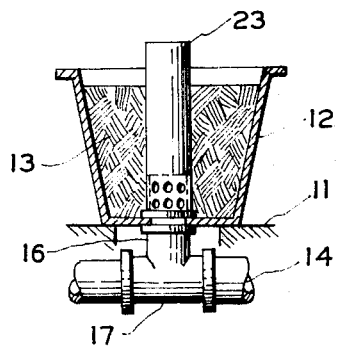
FIG. 1 is a sectional view of a hydroponic cell equipped with the invention.

Referring first to FIG. 1, a foundation structure schematically shown at 11 supports a hydroponic cell 12 of conventional form. Cell 12 is filled to the level shown with a granular material 13. A combined supply and drainpipe 14 is connected to the interior of each cell by a branch 16 of tee 17.

Figure 2:
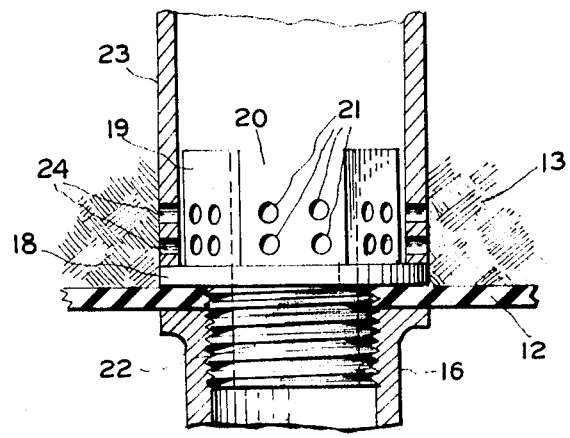
FIG. 2 is a fragmentary axial section of a fitting embodying the invention and showing its attachment to the cell. The scale is larger than that of FIG. 1.

The preferred form of connecting fitting is shown in FIG. 2. It comprises a body having a through bore 20. A central radial flange 18 encircles the body, and the portion 19 of the fitting above the flange 18 has a polygonal cross section. A plurality of ports 21 extend inward from the side faces of portion 19 and intersect the bore 20. The lower portion 22 of the body is threaded. The bottom of cell 12 is provided with an opening which closely encircles the lower portion 22 and is clamped tightly between the end of branch 16 and the flange 18 when the fitting is screwed into place. A tube 23 surrounds the portion 19 of the fitting, and its lower end rests on the flange 18. As shown in FIG. 1, the tube 23 projects from the cell 12. Tube 23 is provided near its lower end with drilled ports 24. Tube 23 may be manually rotated.

Figure 3:
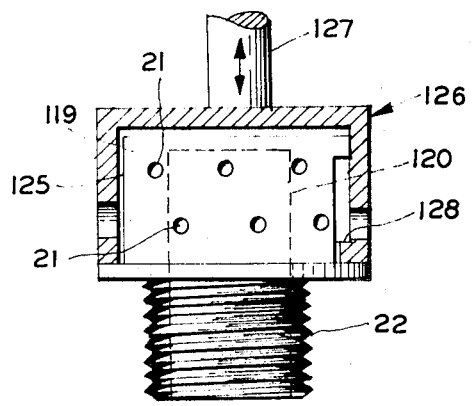
FIGS. 3, 4 and 5 show modifications of the fitting.

As shown in FIG. 3, the upper portion 119 of the fitting may have a circular cylindrical surface 125 through which ports 21 extend. The upper end of bore 120 is closed. The rotary tube 23 may be replaced by a ported cup member 126 connected to the end of an actuating rod 127 which may be reciprocated. A stop 128 limits upward movement of cup 126.

Figure 4:
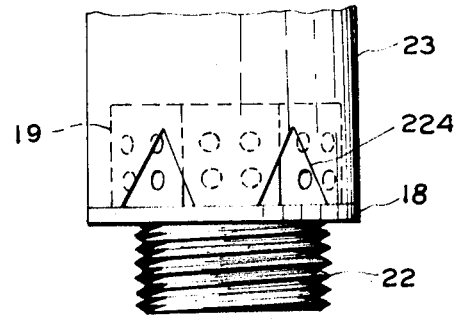

Another modification of the invention is shown in FIG. 4. As shown, the lower edge of rotary tube 23 is provided with V-notches 224 which replace ports 24 of the FIG. 2 embodiment.

Figure 5:
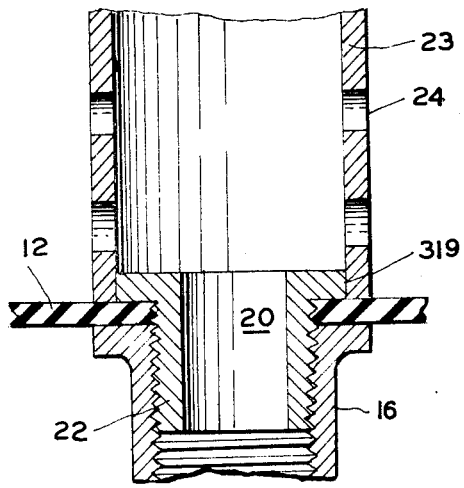

In the FIG. 5 embodiment, the upper portion 319 of the fitting comprises simply a cylindrical bearing of sufficient length to hold the lower end of the rotary tube 23 properly aligned with bore 20.

OPERATION

Liquid nutrient is supplied to cell 12 through pipe 14 periodically. The cell is filled to a certain level, and this level is maintained for a desired time period after which the nutrient is drained from the cell through pipe 14. Some nutrient is retained in the cell by the granular material 13. After the passage of a certain time, the cell is again flooded. This cycle is automatically repeated on a programmed basis, or it may be manually controlled.

As the plant rooted in the material 13 grows, its roots will, unless proper steps are taken, clog the branch 16 and inhibit the proper supply and drainage of nutrient. Referring to FIG. 2, rotation of the sleeve 23 will wipe away any roots which have entered apertures 24. The roots present in the interior of the sleeve may grow to a diameter and length such that they are severed by rotation of the sleeve. This cutting may take place between the surface of member 23 and the granular material 13, or it may occur between the tube 23 and the apices on the polygonal cross section of portion 19. The tube 23 is open at its upper end, and thus a clear view is afforded for inspection of bore 20. The grower can thus ascertain the need to clear roots from branch 16. He also can determine whether nutrient is entering the cell properly and whether proper free drainage is occurring.

In the FIG. 3 embodiment, it is not possible to inspect the condition of branch 16, and the wiping action is limited by the amplitude of the reciprocal motion. While this embodiment is inferior to the FIG. 2 embodiment, it is attractive because of its simplicity.

The V-notches characteristic of the FIG. 4 embodiment afford inclined cutting edges, and provide a better cutting action than the FIG. 2 embodiment. Fine granular material has a tendency to enter between the sleeve 23 and the fitting and may interfere with rotation of the sleeve 23.

In the FIG. 5 embodiment, the cutting or wiping action is performed by the cooperation of the apertured sleeve and the granular material. It is believed that the FIG. 2 embodiment provides a somewhat surer cutting action. This is desirable since the likelihood of creating a dense root mass around the base of the sleeve 23 is reduced.

Experience with the device has been satisfactory and problems of clogging due to the development of a mass of roots in the combined supply and drain connection have been overcome. This greatly facilitates use of this type of hydroponic cell.

I claim:

1. In combination:

A. an open-topped hydroponic cell;

B. a nutrient flow path extending through an opening in a wall of said cell, and having a terminus within said cell;

C. adapter means, mounted at said terminus, and including
  a. a fluid passageway (20, 120) forming a part of said flow path,
  b. a connecting portion (22) received by said terminus, and
  c. means affording a guiding surface projecting upward from said terminus;

D. a tubular element extending upward from said terminus and having its lower portion guided on and encircling said surface, said element having at least one degree of freedom relative to said guiding surface, and having apertures extending therethrough which are unobstructed, by said guiding surface; and E. manually operable means to move said element on said guide in the direction of said one degree of freedom.

2. The combination defined in claim 1 in which said element is reciprocable.

3. The combination defined in claim 1 in which said element is an open-ended, circular cylindrical sleeve rotatable about its longitudinal axis, and having its upper end projecting above the edge of said cell.

4. The combination defined in claim 3 in which said guiding surface is circular cylindrical.

5. The combination defined in claim 1 in which the apertures in the sleeve include notches formed at the lower end of the sleeve.

6. A self-clearing fitting for use at the terminus of a nutrient flow path serving a hydroponic cell comprising:

A. a body including
  a. a cylindrical upper portion (19) having a polygonal cross section;
  b. a connector portion (22),
  c. a projecting, flange intermediate said portions, and
  d. means including apertures opening through said upper portion providing a flow path through said body;

B. a rotatable, right circular cylindrical sleeve, having its lower edge in engagement with said flange, and encircling said upper portion of the body.

* * * * *